July 28, 1970 W. BERGMANN ET AL 3,521,785
INTERLOCKING HOLDING DEVICES
Filed June 18, 1968 2 Sheets-Sheet 1

Inventors
WILHELM BERGMANN
DIETER SOELTER
BY
McGregor and Eisenman
ATTORNEYS

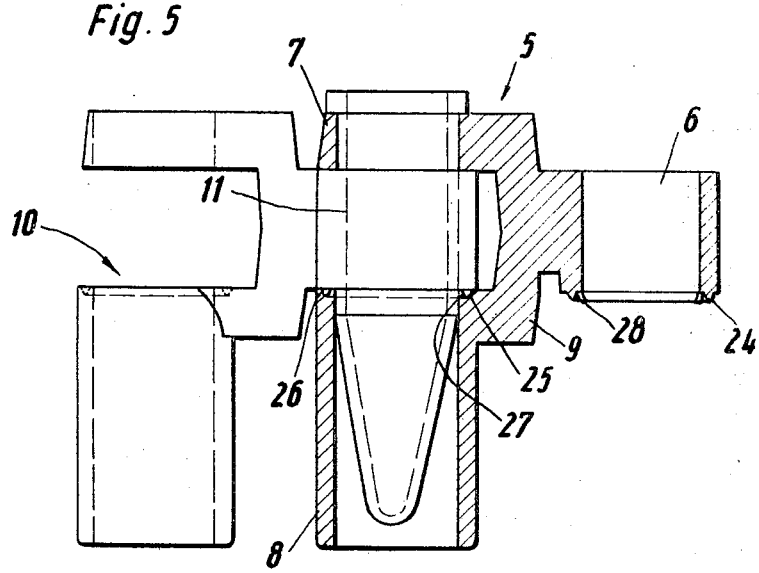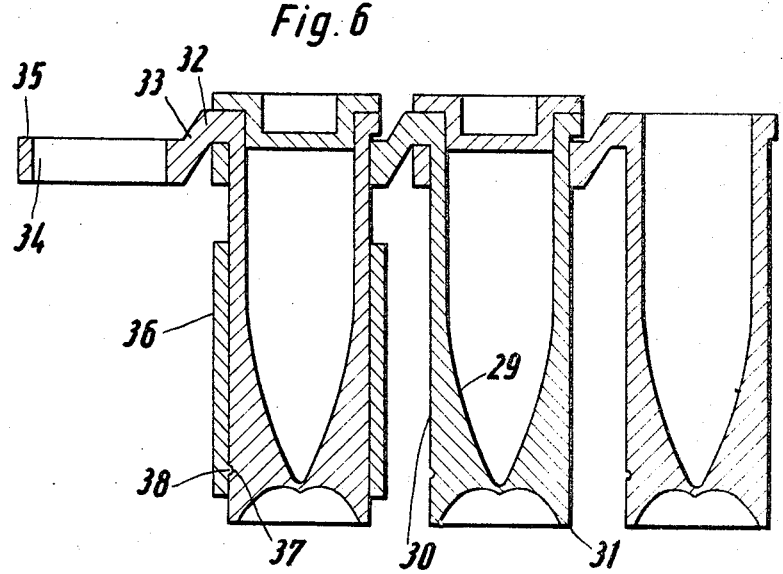

United States Patent Office 3,521,785
Patented July 28, 1970

3,521,785
INTERLOCKING HOLDING DEVICES
Wilhelm Bergmann and Dieter Soelter, Hamburg, Germany, assignors to Eppendorf Geraetebau Netheler and Hinz GmbH, Hamburg, Germany
Filed June 18, 1968, Ser. No. 738,072
Claims priority, application Germany, June 22, 1967, 1,575,122
Int. Cl. B65d *21/02;* B01l *9/00*
U.S. Cl. 220—23.4    12 Claims

ABSTRACT OF THE DISCLOSURE

These uniquely designed devices have adjacent shoulders with apertures for holding small cylindrical vessels in parallel. When used in combination, the vessels act as axes and linking pins about which the devices may pivot. Means are also provided to secure adjacent devices against lateral separation even in the absence of vessels.

BACKGROUND OF THE INVENTION

The present invention is concerned with holding devices for predominantly cylindrical objects or vessels of glass or plastic. Of particular interest, are vessels which are essentially cylindrical but have a tip tapering conically downward. Such vessels are used in analysis work to facilitate the processing of even the smallest quantities of material.

In the past such vessels have been arranged in a certain order on a serial platter, and they remain in this arrangement during different tests. This makes it possible to handle several vessels simultaneously. Adoption of this handling technique, however, requires a large amount of manual work.

It is also known to provide such vessels in a chain-type arrangement. Thus, a closed chain may be arranged with plug openings for individual vessels. The joints of such a chain lie between the vessels and consequently, a relatively long chain is required. Moreover, it is quite complicated to detach or join together individual links of such a chain. In some instances, for example, a joint pin must be taken out or inserted. Such joint pins are additional elements which may be misplaced or may not always be ready at hand. Generally such chains are used as endless chains in very specific arrangements. When this is the case, they are comparable to the above-mentioned platter holder, on which only a certain number of vessels can be handled.

When using such vessels for the chemical analysis of samples, there arises the problem of identifying the vessels. Obviously, the identification or marking must be readable. Furthermore, when test procedures are carried out automatically, the marking must accompany the sample contained in the vessel, so that this marking is available at the evaluation point, where a printer may be operated. This permits the necessary data to be transferred to a record table or the like.

SUMMARY OF THE INVENTION

This invention relates to holding devices; and more particularly to holding devices for cylindrical objects.

An object of the invention is to provide an improved holder for the handling of small vessels, that is suitable as an ordering device in a chain-type arrangement.

Another object of the invention is to provide an improved holder for the handling of small vessels which can be formed in a chain arrangement that is shorter than prior known arrangements.

Another object of the invention is to provide improved holders for the handling of small vessels which can be formed into chains of any size.

Another object of the invention is to provide improved holding devices which can be formed into easily manipulated chains and which can be used in selected lengths of chains as a rack or shipping container for vessels.

Still another object of the invention is to provide an improved holding device which facilitates the marking of vessels secured therein.

The devices of the present invention include two guide portions. Each guide portion has an aperture in which a vessel is adapted to nest. The guide portions are arranged with parallel axes and one portion is offset in height in relation to the other. In addition, the guide portions are designed for mating engagement with the dissimilar portions of corresponding devices. The design of the devices permits them to serve as holders for individual vessels, and also, to serve as links of a chain. In one form of chain, the vessel is inserted through the engaged dissimilar guide portions of two devices and functions in the manner of a hinge pin.

An essential feature of the invention resides in the fact that the vessels plugged into a guide, form a hinge pin between adjacent links when the links are strung together in chain fashion. This renders unnecessary the previously required joint between mounts for adjacent vessels. Also, when lengthening or shortening of the chain, the chain is closed or opened by the insertion or removal of the vessel to be handled.

According to one embodiment of the invention, the holding arrangement is designed in one piece with one vessel, and a shoulder carrying the guide for holding another vessel extends from an upper bead of the first vessel. A guide on a shoulder of an adjacent vessel rests against the shoulder of the first vessel and thereby insures alignment in height of adjacent vessels in a chain.

According to another embodiment of the invention, the holding arrangement is detachable from the vessels and is designed to serve as a link between adjacent vessels. The link has two substantially cylindrical guides, which are offset in height in relation to each other, so that one guide can be brought into alignment with the other guide by the insertion of a vessel. In this design also, the vertical position of the vessel is insured by means of an upper bead. With the described embodiments, when a guide extends into the plane of the vessel bottom, a link can be used as rack means for a single vessel, and the other guide will serve as handle.

When the holding arrangement is fixed on the bead, another design form of the vessel may be preferred. In this case, although the interior of the vessel may taper conically downward, it is advantageously provided on its outside with a cylindrical shell, whose lower edge terminates below the vessel bottom. This makes the vessel a self-supporting unit, and has the further advantage that it becomes convenient to affix exchangeable markings to the shell.

An advantageous structure comprising the prescribed two substantially cylindrical guides is obtained by designing one guide in upper and lower parts with an annular section for the upper end of the vessel and spaced therefrom, a lower cylindrical section surrounding the lower end of the vessel. The other guide is designed to fit between the two sections. With such a link, a defined vessel position is obtained upon insertion of a vessel into the two-part guide, because a bead on the vessel is supported by the annular section, while the other guide forms a handle approximately at midheight. At least one of the sections or the other guide part, may be slotted lengthwise and designed with a smaller inside diameter than that outside diameter of the vessel, so that it forms a spring clamp for the retention of the vessel. With this clamping feature, the vessel is detachably fixed in position and cannot readily turn; and it cannot slip out of the link in the event it is shaken or tilted.

In accordance with a further feature of the invention, the guides are provided with supplementary engagement means so that even without insertion of a vessel they can be brought into a detachable union. In one design form the links each have guides with engagement means that are joinable or detachable only when there is an angular offset of the two links. In this design, when there is a substantially aligned arrangement of adjacent links relative to each other, they are held together under traction even without an inserted vessel. In another design form, engagement means are provided at the butting edges of adjacent guides or guide sections; the engagement means comprising an annular web in one section which can snap into an opening or groove provided in the edge of the other section. Links assembled in this manner can be used to particular advantage as shipping containers, because the vessels of the chain, or the links without inserted vessels, can be collapsed to occupy a minimum of space, without unintentional opening.

Another essential feature of the invention, in particular with vessels which have a cylindrical outer shell, resides in a marking sleeve which can be slipped onto the cylindrical outer shell. The sleeve can be wedged on the vessel and in one or more circumferential rows presents markings for the identification of the vessel. Advantageously, mating, projecting and/or receding profiles are provided between the inside of the marking sleeve and the outside of a cylindrical vessel wall.

According to another embodiment of the invention, one of the guide parts is provided with an aperture extending over a circumference of less than 360 degrees, through which the vessel is visible. This embodiment renders possible fully automatic processing of the samples, because any lettering or marking on the vessels can be read directly, even if the vessels are already in a chain whose links have guides which more or less surround the individual vessels.

A full understanding and appreciation of the invention will become available from the following detailed description of several specific embodiments. The description is made in conjunction with the drawing which contains enlarged schematic views of the structures involved.

BRIEF DESCRIPTION OF THE DRAWING

FIG. 1 is a side view of a vessel of the type the invention is contemplated to function with;

FIG. 5 is a side view of another embodiment of the invention, with one link shown in section; and FIG. 6 is a side view in section of another embodiment of the invention, showing a chain construction with three vessels, each in one piece and provided with a holding arrangement.

DESCRIPTION OF THE PREFERRED EMBODIMENTS

Figure 1:
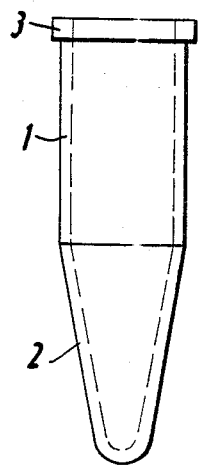

In the following description, similar parts in the various figures are designated with the same reference numerals. The type of vessel which may be used with the invention, may be made of plastic, and as shown in FIG. 1, it may have a cylindrical section 1, to which is joined a downwardly tapering section 2 with a conical bottom. At the upper end, an outwardly projecting bead 3 is provided which facilitates the handling of the vessel and also forms an abutment upon insertion into a chain arrangement when the holding arrangement described hereinafter, is not in one piece on the vessel.

Figure 2:
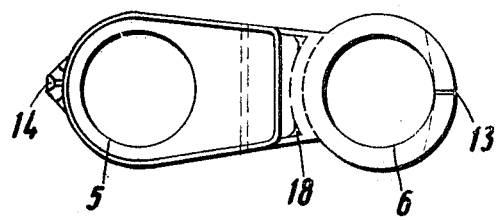
FIG. 2 is a top view of a link embodying the invention.
Figure 3:
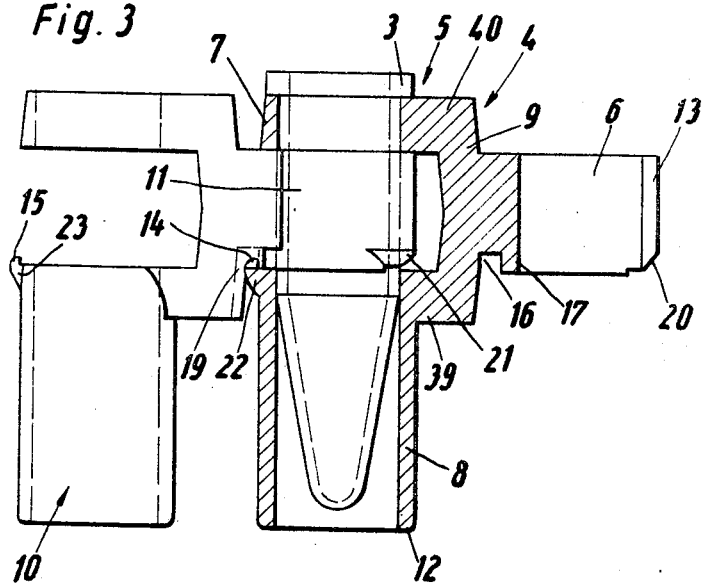
FIG. 3 is a side view of a chain section comprising two connected links with a vessel inserted in the joint therebetween, one of said links being shown in section.
Figure 4:
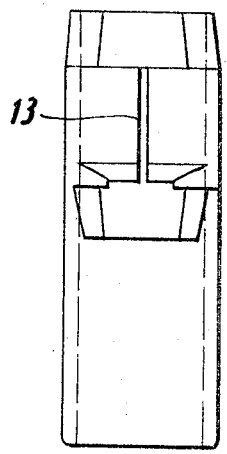
FIG. 4 is a right side view of the apparatus shown in FIG. 3.

FIGS. 2 and 3 show that the link 4 of the invention has two guides 5, 6 for vessels. These guides are arranged parallel to each other and offset in height, so that the different guides of two links can be brought into alignment with each other. Guide 5 consists of two sections: The upper section 7 is annular; and the lower section 8 has the form of a cylindrical bushing. The two sections are held together by a connecting part 9. The portion of part 9 away from guide 5 forms or carries the guide 6. The connecting part 9 is comparable to a shoulder which holds a guide in spaced relation to a vessel inserted in another guide. The height of guide 6 is such that it fits exactly into the space between sections 7 and 8 of a guide 5 of an adjacent link. Thus, the union of two adjacent links is possible.

FIG. 3 shows two links in combination. The guide 11 of link 10 is placed between guide sections 7 and 8 of link 4. Following the placement, a vessel is inserted, with bead 3 resting on the upper annular section 7. As illustrated, the cylindrical section 8 may be made long enough to extend at least to the level of the rounded bottom of the vessel. With this structure, a link can be used alone as mount for a vessel, because the lower edge 12 of the section 8 forms a rack surface. Furthermore, in this type of use, the guide 6, which extends laterally from the vessel, forms a handle.

One of the guides 5 or 6, or only one section 7 or 8 of guide 5, may be designed as a spring clamp for the elastic retention of the vessel. In the embodiment of FIGS. 2 and 3, guide 6, on the side away from the connecting part 9, has a longitudinal slot 13. Structurally, guide 6 may be designed with a somewhat smaller inside diameter than the outside diameter of a vessel. The guide is then spread apart somewhat upon insertion of the conical end 2 of the vessel. This is possible when an elastic or even just slightly elastic plastic is used.

The described form of construction permits an assembly of links wherein the hinge pins of the resulting chain are formed by vessels. The links can be separated from each other by removal of a vessel. When the vessels are in place, the links can be pivoted in relation to each other about the joint for the setting up of two or three vessels in a minimum of space.

In a variation of the invention, the connecting part 9 could be made much thinner, for example, with about the same dimensions as the wall thickness of guide 6 or of the guide section 7. With this structure, adjacent vessels would be held together more closely than is evident from FIG. 3.

Another feature of the invention concerns means for coupling the individual links even without an inserted vessel. The resulting chain is then suitable also as a shipping container, since it is possible to accommodate in a package detachably joined links of a certain number. At the upper edge of the lower section 8 of guide 5, or respectively, of guide 10 on the side away from the connecting part 9, an upwardly extending profile in the form of a shoulder 14, 15 is provided. This projection is adapted for engagement with another link in a downwardly open recess 16 in the wall 17 of guide 6.

In the construction shown, the shoulder 15 is made relatively narrow, but the wall of recess 16 may concentrically encircle the axis of guide 6 over a certain section. For example, the arch of the wall of the recess 16 is designated by 18 in FIG. 2. It can be seen in FIG. 3, that the lateral faces 19 of wall 18 completely cover the shoulder 14 in the lateral projection. Thus, the lateral faces 19 form lateral abutments for the profiles 14, 15 upon lateral movement of a link whose axis is aligned with that of another link. When links 4, 10 are joined together in the manner shown, but without a vessel, it is not possible to separate them from each other by lateral displacement, or to detach them by a pull parallel to the plane of the drawing. Of course, since the links may be made of plastic, the resistance to pulling force depends on the strength of the material. It will be appreciated that if links 4 and 10 are pivoted in relation to each other by 90 degrees, the links can be lifted off each other in a direction parallel to the plane of the drawing.

It is also possible to form the shoulder 14 or 15 over an arc as a concentric web section on the exterior edge of the lower guide section. This web would engage the recess 16, with the web resting against the outside of the wall part 17. Here again, a locking takes place in the manner described above. In the case of such a design, however, the guide 6 or 11 would have to be provided on its mating edge, i.e., the lower edge, with a counter-profile 20, 21, designed in the example in the form of a downwardly and inwardly extending bevel, covering a certain arc section. The extent is such that when the links are pivoted in relation to each other by 90 degrees, the profile 14 or 15 in the form of an annular web could be pulled off laterally.

Obviously, corresponding projections could also be provided on the underside of the annular section 7, or respectively, a corresponding supplementary engagement could be designed if a projection is provided on guide 6 and recesses corresponding to recess 16 are arranged, for example, on the connecting pieces 39 or 40 between connecting part 9 and the guide sections 7 or 8.

FIG. 5 illustrates another embodiment of the invention. In this embodiment, a guide 11 of link 10 engages between sections 7 and 8 of guide 5. At the lower edges of guides 6 and 11, downwardly projecting annular webs 24, 25 are provided. Corresponding annular grooves 27, which may have a semicircular cross section, are provided in the upper edge 26 of the guide section 8. Due to the elasticity of the materials, the annular webs 24, 25 can be made to engage in the correlated annular grooves.

The form of construction in FIG. 5 can be further simplified by positioning the annular webs directly at the edge of the guide aperture, as shown by web 28. This annular web 28 can be snapped into the mating aperture in section 8, which may be enlarged somewhat at the top. This form of construction has essential advantages because any desired pivoting of the adjacent links is possible, yet the engagement means do not permit a separation of these links without resistance.

Naturally, the annular webs and possibly also the annular grooves may be provided elsewhere, for example, at the top of the guides 6 or 11, in which case a counter-profile would be provided at the bottom of the guide section 7.

FIG. 6 shows an embodiment of the invention with new features for a vessel. In this case, a vessel 29 has a downwardly conically tapering receiving space, but a cylindrical outer wall or shell 30. The lower edge 31 of shell 30 lies lower than the bottom of the vessel. Such a vessel can stand independently. In the form of construction shown, vessels 29 have an upper bead 32. From bead 32, a shoulder 33 extends directed obliquely downward and has a guide 34 at its end. Advantageously, the guide may be of a ring type whose aperture has an axis extending parallel with vessel 29. The upper edge 35 of guide 34 lies in a plane with the lower edge of the bead 32. When, therefore, another vessel is inserted into guide 34, it is held by its bead at the same level as the vessel on which the shoulder 33 and the guide 34 are provided. It will be clear that instead of bead 32, a ring may be provided into which the vessel may be inserted. In which case, the vessel would rest against this ring by its bead. Furthermore, the guide 34 may be slotted to impart elasticity in the same manner as the guide 6 of FIGS. 2 and 3.

This design of FIG. 6 also offers the advantage that a marking sleeve 36 of plastic can be slipped onto the outer shell 30. Depressions 37 may be provided in the cylindrical shell 30, and on the inside of the sleeve 36 a mating stud type projection 38 will snap into the depression 37 when the sleeve is slipped on. This provides a nonrotating arrangement at a certain level, so that with the reference point of a shoulder 33 arranged fixed on the vessel, symbolic markings defined on the sleeve can be read, i.e., can express a certain meaning with respect to their arrangement in height and on the circumference. Such markings may consist of optically readable lines or dots, or of depressions or elevations.

Several illustrative embodiments of the invention have been shown and described. Numerous advantages and modifications will be apparent to those familiar with this art. In the following claims, it is intended to cover all devices and arrangements coming within the spirit and teachings of the invention.

What is claimed is:

1. A holding device having adjacent shoulders with guide apertures therethrough, said apertures being oriented with parallel axes and being adapted to hold vessels of cylindrical configuration, said shoulders being vertically offset in relation to each other, engagement means at the two shoulders for detachably joining adjacent devices to hold together under traction without a vessel, said adjacent devices being joined together and detached only when angularly offset, and being held together when said adjacent devices are in substantially aligned arrangement.

2. A holding device according to claim 1, wherein the wall of one of the apertures has a longitudinal slot therein, and said aperture has a smaller diameter than the outside diameter of said vessels.

3. A holding device according to claim 1, wherein said joining and detachment occurs when said adjacent devices are pivoted by 90 degrees.

4. A holding device having adjacent shoulders with guide apertures therethrough, said apertures being oriented with parallel axes and behing adapted to hold vessels of cylindrical configuration, said shoulders being vertically offset in relation to each other to permit alignment of the apertures in the upper and lower shoulders of similar devices for the insertion of a vessel therein, one shoulder having an upper annular section and spaced therefrom a lower cylindrical section, and the other shoulder projecting outwardly in the zone between the two sections, and including a projection on a section of one shoulder extending into the space between said sections, said projections being adapted to engage behind a wall section of the other shoulder.

5. A holding device according to claim 4, wherein said wall section extends substantially concentrically with the aperture in said other shoulder and forms lateral abutments for the projection upon lateral movement of a device whose axis is aligned with that of another device.

6. A holding device according to claim 4, wherein said projection is an annular web concentric with the adjacent aperture, said web extending only over a small circumferential section, and said other shoulder having a recess at the mating surface created when two devices are adjacently arranged.

7. A holding device having adjacent shoulders with guide apertures therethrough, said apertures being adapted to hold vessels of cylindrical configuration and said shoulders being vertically offset in relation to each other to permit alignment of the guide apertures of similar devices when the lower surface of the upper shoulder of a first device is placed in butting contact with the upper surface of the lower shoulder of a second device, such positioning effecting the placing of the upper surfaces of the upper shoulders of said first and second devices in substantially the same plane, and engagement means beyond the periphery of said apertures at said shoulders for detachably joining the upper and lower shoulders of said devices to hold together under traction without obstructing said apertures.

8. A holding device according to claim 7, in combination with a cylindrical shell coaxially arranged with one of said guide apertures, having an internal diameter similar to that of said apertures, and having a lower edge which terminates between the bottom of a vessel mounted in the holding device.

9. A holding device according to claim 8, in combination with a marking sleeve surrounding said cylindrical shell, and means on the inside surface of said sleeve cooperating with means on the outside surface of said cylinder to secure the sleeve in a predetermined position on the cylinder.

10. A holding device according to claim 8, wherein said cylindrical shell, said vessel, and one of said shoulders are all formed as an integral element with said adjacent shoulder extending from the upper portion thereof.

11. A holding device according to claim 7, wherein the wall of one of the apertures has a longitudinal slot therein, and said aperture has a smaller diameter than the outside diameter of said vessels.

12. A holding device according to claim 7, having an annular web and cooperating annular groove at the mating edges of the shoulders of two devices that are adjacently arranged.

References Cited

UNITED STATES PATENTS

| | | |
|---|---|---|
| 1,282,511 | 10/1918 | Williams. |
| 1,949,903 | 3/1934 | Fales. |

FOREIGN PATENTS

| | | |
|---|---|---|
| 1,099,180 | 8/1955 | France. |
| 612,786 | 4/1935 | Germany. |

GEORGE E. LOWRANCE, Primary Examiner

U.S. Cl. X.R.

23—259; 24—201; 59—78